United States Patent
Melin et al.

(10) Patent No.: US 6,934,834 B2
(45) Date of Patent: Aug. 23, 2005

(54) COMPUTER PROGRAM FOR CONTROLLING THE MANNER IN WHICH AN OPERATING SYSTEM LAUNCHES A PLURALITY OF APPLICATION PROGRAMS

(75) Inventors: Jennifer L. Melin, Boise, ID (US); Brent Blazek, Meridian, ID (US); Chris Mesa, Meridian, ID (US); Richard Burgin, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 725 days.

(21) Appl. No.: 09/944,814

(22) Filed: Aug. 31, 2001

(65) Prior Publication Data

US 2003/0046525 A1 Mar. 6, 2003

(51) Int. Cl.⁷ .............................. G06F 9/00; G06F 9/24
(52) U.S. Cl. .................. 713/2; 713/1; 718/1; 718/100; 718/102; 718/106
(58) Field of Search ............................ 713/1, 2; 718/1, 718/100, 102, 106

(56) References Cited

U.S. PATENT DOCUMENTS 6,430,706 B1 * 8/2002 Santerre et al. ............... 714/36
6,567,912 B1 * 5/2003 Belkin et al. .................. 713/2
6,760,337 B1 * 7/2004 Snyder et al. ............ 370/395.4

OTHER PUBLICATIONS

Ziring David A, Registry entries: RunOnce, Mar. 13, 1996.*
AUTOEXEC.BAT and CONFIG.SYS, Feb. 15, 1999, pp. 1–3.*
Nutt Gary J, Operating Systems: A Modern Perspective, 2000, Addison–Wesley, Second Ed., pp. 155–179.*
Heald Nathan, AUTOEXEC.BAT Files, Feb. 21, 2001 pp. 1–4.*

* cited by examiner

Primary Examiner—Thomas Lee
Assistant Examiner—Mark Connolly (57) ABSTRACT

A computer program and method for controlling the manner in which an operating system associated with a computer launches a plurality of application programs. Briefly described, one of many possible embodiments is a computer program for use in a computer having an operating system. The computer program may comprise code for: determining application programs that are to be launched by the operating system; determining a program launch procedure associated with the application programs, the program launch procedure defining a sequence in which the application programs are to be launched by the operating system, the sequence based on the functionality of at least one of the application programs; and launching the application programs with the operating system based on the program launch procedure.

21 Claims, 6 Drawing Sheets

PROGRAM LAUNCH TABLE 300

| SEQUENCE INDICATOR 302 | PROGRAM NAME 304 | PATH 306 | O/S RESTRICTIONS 308 | PROGRAM DEPENDENCY 310 | ADDITIONAL PARAMETERS 312 |
|---|---|---|---|---|---|
| 1 | instlinks | hppinstlinks.exe | Do not launch with Windows 95 O/S | N/A | |
| 2 | Director | hppdirector.exe | | Launch after 1 has completed | |
| 3 | Software Config. | hppsoftconfigpage.exe | | If user requests test page print, launch after 2 has launched | |

COMPUTER PROGRAM FOR CONTROLLING THE MANNER IN WHICH AN OPERATING SYSTEM LAUNCHES A PLURALITY OF APPLICATION PROGRAMS

TECHNICAL FIELD

The present invention is generally related to operating systems, and more specifically to programs implemented by operating systems for launching a plurality of application programs.

BACKGROUND OF THE INVENTION

Currently, most computers include within memory a variety of software applications and an operating system, which are both implemented by a processor. In general, operating systems control the allocation and usage of hardware resources, such as memory, processor time, disk space, input/output (I/O) devices, and other peripherals. The operating system creates a common platform for all software applications on a computer. In other words, the operating system functions as an all-encompassing bridge between the hardware resources and the software applications that use the hardware resources.

When a computer is turned on or rebooted, the operating system is loaded from memory and a variety of initialization and/or configuration programs are run. Many current operating systems include a system initialization program configured to launch a plurality of application programs specified in the program. Such operating systems typically determine the list of application programs to be launched, and then merely launch the applications at once. The operating system does not enable the application programs to be launched in a predetermined manner. This may be problematic in situations where it is desirable to control the manner in which the application programs are to be launched by the operating system.

SUMMARY OF THE INVENTION

The present invention provides a computer program and method for controlling the manner in which an operating system associated with a computer launches a plurality of application programs.

Briefly described, one of many possible embodiments is a computer program for use in a computer having an operating system. The computer program may comprise code for: determining application programs that are to be launched by the operating system; determining a program launch procedure associated with the application programs, the program launch procedure defining a sequence in which the application programs are to be launched by the operating system, the sequence based on the functionality of at least one of the application programs; and launching the application programs with the operating system based on the program launch procedure.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

I. Overview

Figure 1:
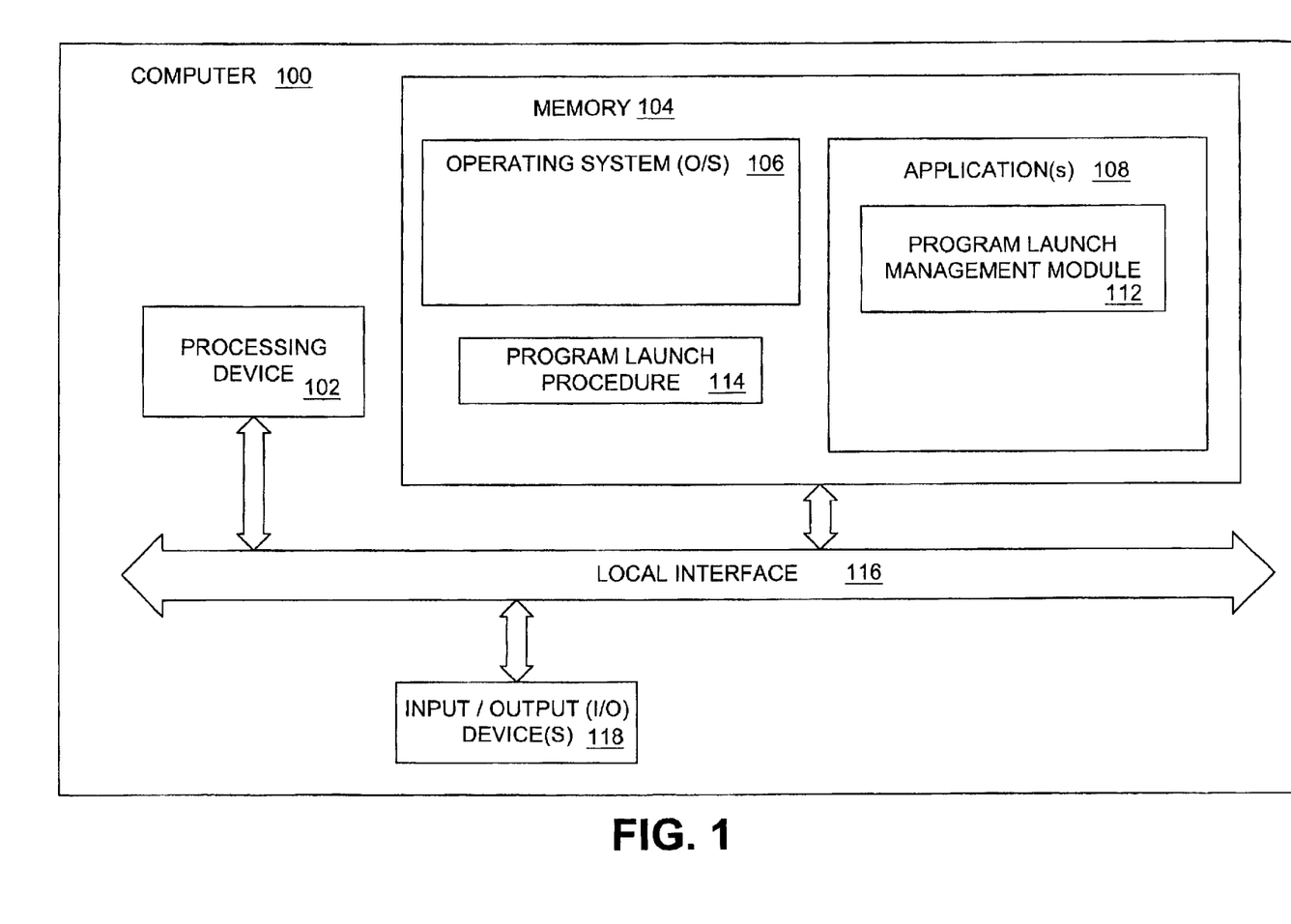
FIG. 1 is a schematic diagram illustrating one embodiment of a computer for implementing an embodiment of the present invention.

FIG. 1 illustrates a representative computer 100 in which a program launch management module 112 according to the present invention may be implemented. As described in detail below, program launch management module 112 provides a means for controlling the manner in which an operating system 106 launches a plurality of specified application programs 108. Program launch management module 112 may be implemented as a stand-alone computer program that is called by operating system 106. Alternatively, program launch management module 112 may be integrated with operating system 106 or with any other application 108 located in memory 104.

Embodiments of program launch management module 112 may be implemented in software, firmware, hardware, or a combination thereof. In the embodiment illustrated in FIG. 1, the program launch management module 112 is implemented in software, as an executable program, and is executed by a special or general purpose digital computer, such as a personal computer (PC) (IBM-compatible, Apple-compatible, or otherwise), workstation, minicomputer, or mainframe computer. Computer 100 of FIG. 1 is an example of a general purpose computer that may implement the program launch management module 112.

Generally, in terms of hardware architecture, the computer 100 may include a processing device 102, memory 104, and one or more input and/or output (I/O) devices 118 (or peripherals) in communication via a local interface 116. Local interface 116 may be, for example but not limited to, one or more buses or other wired or wireless connections. Local interface 116 may have additional elements, which are omitted for simplicity, such as controllers, buffers (caches), drivers, repeaters, and receivers, to enable communications. Further, local interface 116 may include address, control, and/or data connections to enable appropriate communications among processing device 102, memory 104, and I/O devices 118. Processing device 102 is a hardware device for executing software stored in memory 104. Processing device 102 may be any custom made or commercially available processor, a central processing unit (CPU), an auxiliary processor among several processors associated with the computer 100, a semiconductor based microprocessor (in the form of a microchip or chip set), a macroprocessor, or generally any device for executing software instructions. Nonlimiting examples of commercially available microprocessors are as follows: a PA-RISC series microprocessor from Hewlett-Packard Company, an 80x86 or Pentium series microprocessor from Intel Corporation, a PowerPC microprocessor from IBM, a Sparc microprocessor from Sun Microsystems, Inc, or a 68xxx series microprocessor from Motorola Corporation.

Memory 104 may include any one or combination of volatile memory elements (e.g., random access memory (RAM, such as DRAM, SRAM, SDRAM, etc.)) and non-volatile memory elements (e.g., ROM, hard drive, tape, CDROM, etc.). Memory 104 may incorporate electronic, magnetic, optical, and/or other types of storage media. One of ordinary skill in the art will appreciate that memory 104 may have a distributed architecture, where various components are situated remote from one another, but may be accessed by the processing device 102.

The software in memory 104 may comprise one or more applications 108, one of which is program launch management module 112 (described in detail herein), an operating system 106, and a program launch procedure 114. As described in more detail below, program launch procedure 114 defines the manner in which specified application programs are to be launched by operating system 106. Each application 108 comprises an ordered listing of executable instructions for implementing logical functions. A nonexhaustive list of examples of suitable commercially available operating systems 106 is as follows: (a) a Windows operating system available from Microsoft Corporation; (b) a Macintosh operating system available from Apple Computer, Inc.; (c) a NetWare operating system available from Novell, Inc.; (d) a UNIX operating system, which is available for purchase from many vendors, such as the Hewlett-Packard Company, Sun Microsystems, Inc., and AT&T Corporation; (e) a LINUX operating system, which is freeware that is readily available on the Internet; (f) a run time VxWorks operating system from WindRiver Systems, Inc.; or (g) an appliance-based operating system, such as that implemented in handheld computers or personal data assistants (PDAs) (e.g., PalmOS available from Palm Computing, Inc. and Windows CE available from Microsoft Corporation). Operating system 106 essentially controls the execution of applications 108 and provides scheduling, input-output control, file and data management, memory management, and communication control and related services.

Embodiments of program launch management module 112 may comprise a source program, executable program (object code), script, or any other entity comprising a set of instructions to be performed. In situations where program launch management module 112 comprises a source program, the program may need to be translated via a compiler, assembler, interpreter, or the like, which may or may not be included within memory 104, so as to operate properly in connection with operating system 106. Other embodiments of program launch management module 112 may be written as (a) an object-oriented programming language, which has classes of data and methods, or (b) a procedure programming language, which has routines, subroutines, and/or functions, such as C, C++, Pascal, Basic, Fortran, Cobol, Perl, Java, and Ada.

I/O devices 118 may include input devices, such as, for example, a keyboard, mouse, scanner, microphone, etc. Furthermore, the I/O devices 118 may also include output devices, such as, for example, a printer, display, etc. I/O devices 118 may further include devices that communicate both inputs and outputs, such as, for example, a modulator/demodulator (modem) for accessing another device, system, or network, a radio frequency (RF) or other transceiver, a telephonic interface, a bridge, a router, etc.

Where computer 100 is a PC, workstation, or the like, the software in the memory 104 may further include a basic input output system (BIOS). The BIOS is a set of essential software routines that initialize and test hardware at startup, start the operating system 106, and support the transfer of data among the hardware devices. The BIOS is stored in read-only memory (ROM) so that the BIOS can be executed when the computer 100 is activated.

In operation, the processing device 102 is configured to execute software stored within the memory 104, to communicate data to and from the memory 104, and to generally control operations of the computer 100 pursuant to the software. Program launch management module 112 and the operating system 106, in whole or in part, but typically the latter, are read by the processing device 102, perhaps buffered within the processor 102, and then executed.

When program launch management module 112 is implemented in software, as is shown in FIG. 1, it should be noted that program launch management module 112 may be stored on any computer readable medium for use by or in connection with any computer related system or method. In the context of this document, a computer readable medium is an electronic, magnetic, optical, or other physical device or means that can contain or store a computer program for use by or in connection with a computer related system or method. Program launch management module 112 may be embodied in any computer readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer readable medium" may be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In alternative embodiments, where program launch management module 112 is implemented in hardware, program launch management module 112 may be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

II. Program Launch Management Module

Figure 2:
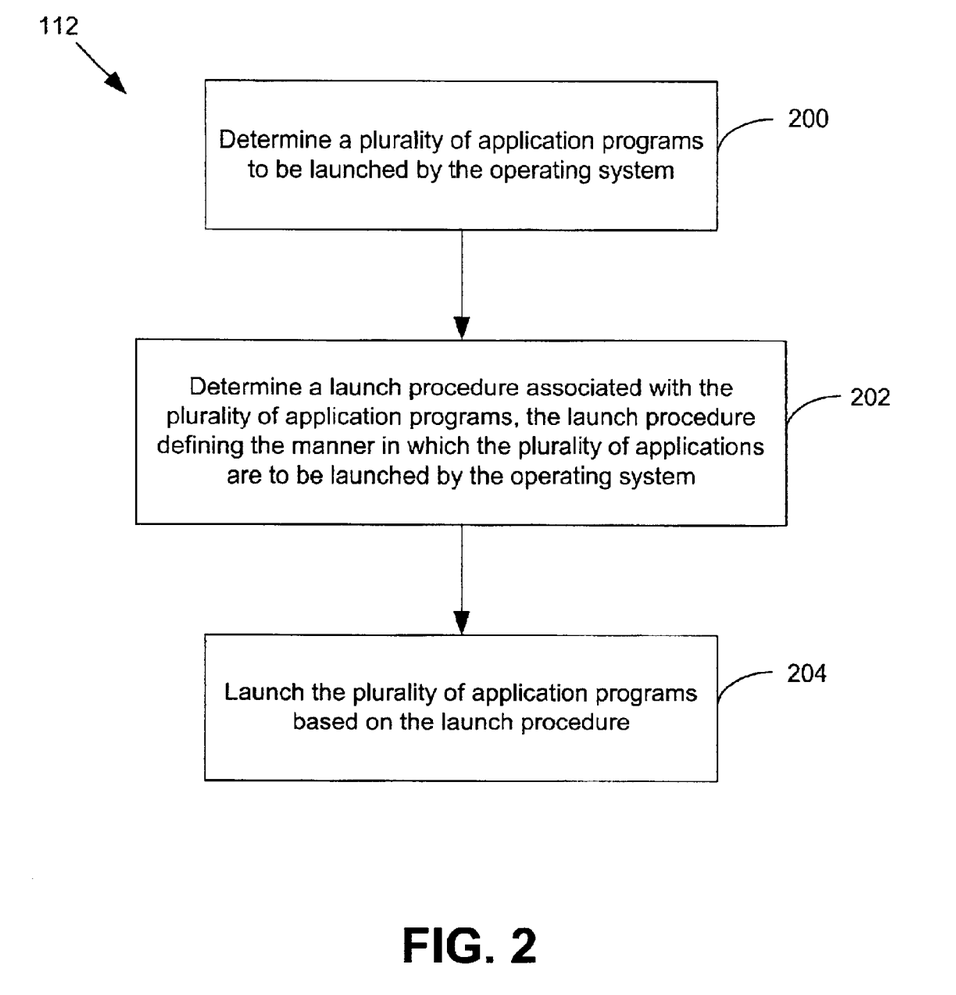
FIG. 2 is a flowchart illustrating the general architecture, operation, and/or functionality of an embodiment of the program launch management module of FIG. 1.

FIG. 2 is a flowchart illustrating the general architecture, operation, and/or functionality of a representative program launch management module 112 for controlling the manner in which an operating system 106 launches a plurality of application programs 108. Although in FIG. 1 program launch management module 112 is shown as a stand-alone program residing in memory 104, one of ordinary skill in the art will appreciate that program launch management module 112 may be implemented within operating system 106 or any other application 108 located in memory 104.

Furthermore, one of ordinary skill in the art will appreciate that, although the program launch management module 112 controls the manner in which applications are to be launched by operating system 106, program launch management module 112 need not be initiated by operating system 106. For instance, in certain embodiments, program launch management module 112 may be initiated by the operating system 106, such as where the computer 100 is rebooted and operating system 106 is initiated. In other embodiments, program launch management module 112 may be initiated by another application 108. For example, as described below in more detail, program launch management module 112 may be initiated by a software installation program configured to install the application programs. In these embodiments, the application 108 triggers initialization of the operating system 106 and the operating system 106 executes program launch management module 112.

Referring to FIG. 2, at block 200, program launch management module 112 determines a plurality of application programs that are to be launched by the operating system. In one embodiment, program launch management module 112 may determine the application programs by receiving information from a user via a user interface (not shown) associated with the computer 100. For example, such a program launch management module 112 may be configured to prompt the user, such as via a graphical user interface, to identify the application programs.

Program launch management module 112 may also determine the application programs to be launched by accessing information already stored in memory 104. For example, as described in more detail below, a program launch procedure 114 may be located in memory 104. Program launch procedure 114 may comprise any data file that contains information identifying the application programs to be launched, such as a text file, a data table, an application file, such as a database file, a spreadsheet file, etc. Furthermore, program launch procedure 114 may be configured to enable a user to edit the information contained in the data file.

At block 202, program launch management module 112 determines a program launch procedure associated with the application programs. The program launch procedure defines the manner in which the plurality of application programs are to be launched by operating system 106. Program launch management module 112 may determine the program launch procedure by receiving appropriate information via the user interface and/or by accessing information contained in a data file, such as program launch procedure 114 (FIG. 1).

Figure 3:
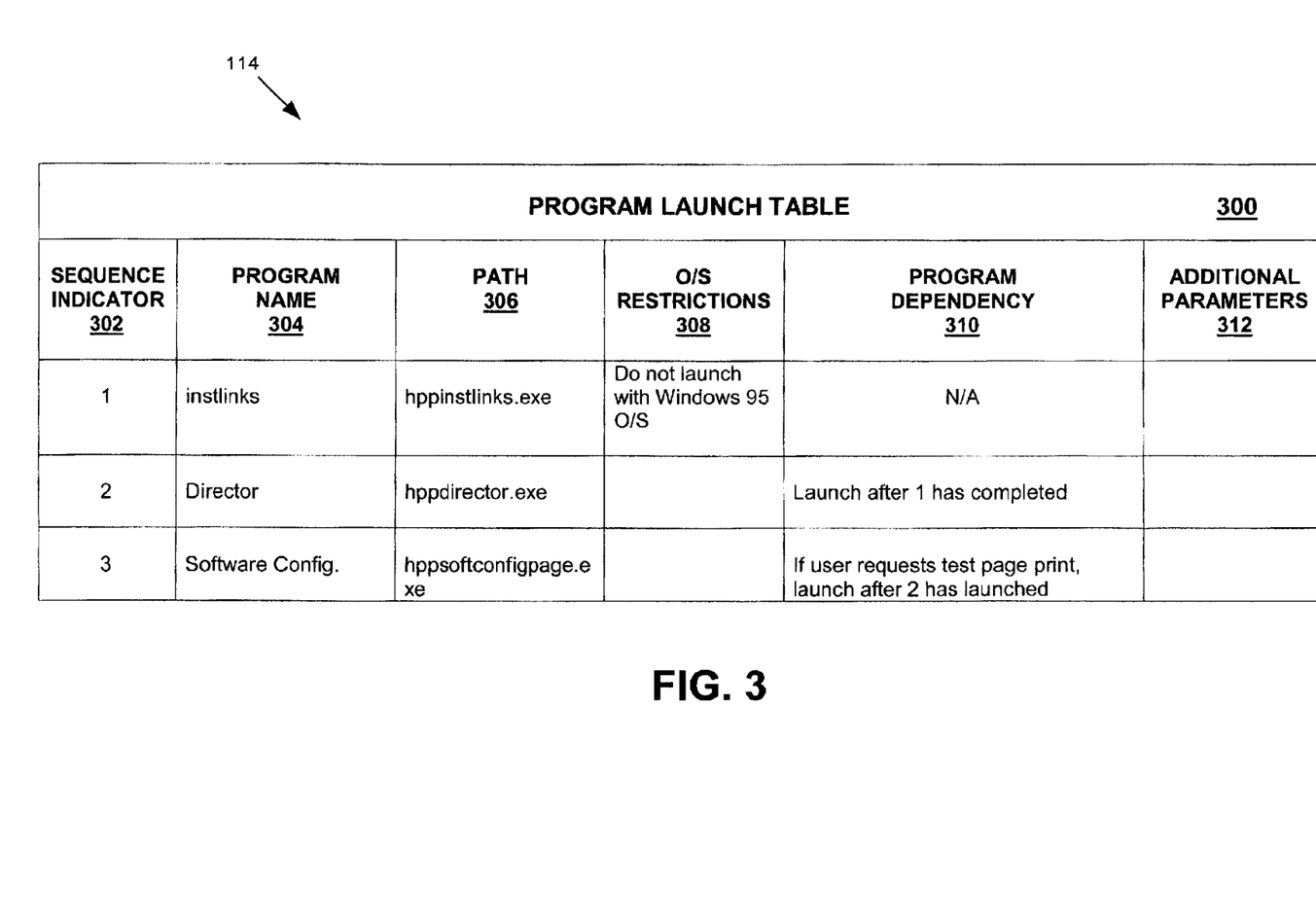
FIG. 3 is a diagram illustrating one possible embodiment of the program launch procedure of FIGS. 1 and 2.

As illustrated in FIG. 3, an embodiment of program launch procedure 114 for defining the manner in which the application programs are to be launched by the operating system may comprise a table 300. Table 300 may comprise a plurality of horizontal rows in which each row corresponds to one of the plurality of application programs to be launched by the operating system. Table 300 may also comprise a plurality of vertical columns associated with each horizontal row. For example, the vertical columns may comprise one or more of the following: a sequence indicator column 302, a program name column 304, a path column 306, an O/S restrictions column 308, a program dependency column 310, and an additional parameters column 312. In this manner, the table 300 defines a plurality of parameters associated with each application program, which may be used by program launch management module 112 to configure the manner in which the application programs are to be launched.

Sequence indicator column 302 may be used to identify the sequence in which the application programs are to be launched by the operating system. Program launch management module 112 may determine the appropriate sequence by reading the values in sequence indicator column 302. Program name column 304 may be used to identify the common name for each of the application programs. For example, in FIG. 3, three programs are scheduled to be launched and in the following order: (1) instlinks, (2) Director, and (3) Software Configuration. Path column 306 may be used to identify the filename used to launch the corresponding application program, as well as the location of the particular file. For instance, as shown in FIG. 3, the Director application program may be launched by executing the file "hppdirector.exe." O/S restrictions column 308 may be used to identify whether a particular application program should or should not be executed where a particular operating system is employed in the computer.

Program dependency column 310 may be used to specify various conditions under which a particular application program is to be launched relative to another application program. For example, program dependency column 310 may be used to specify whether the launch of one application program should be completed prior to launching the next application program in the sequence. Furthermore, there may be situations in which a predetermined contingency related to the launch of one application program should occur before the next application program should be launched. For instance, in order to launch and/or operate properly, one application program may have to access certain data, which is only available after another application program has reached a predefined point in the launch process. Thus, program dependency column 310 may be used to specify the predefined contingency. Alternatively, program dependency column 310 may be used to specify a predefined amount of time to wait during the launch process of one application program before launching the next application program in the sequence.

One of ordinary skill in the art will appreciate that various additional parameters may be used in order to further refine and/or configure the manner in which the application programs are launched by the operating system. Accordingly, as illustrated in FIG. 3, table 300 may further comprise an additional parameters column 312 that defines any of a variety of other types of information for controlling the manner in which the application programs are launched.

Referring again to FIG. 2, at block 204, program launch management module 112 launches the specified application programs in the manner specified by the program launch procedure. Again, the program launch procedure may be specified in a data file stored in memory, such as program launch procedure 114 described above, or alternatively, may be received by program launch management module 112 via a user interface. Regardless of the manner in which the program launch procedure is determined, program launch management module 112 launches the application programs based on the program launch procedure.

Based on the embodiment of program launch procedure 114 illustrated in FIG. 3, program launch management module 112 would launch the application programs as follows: (1) if the operating system is not Windows 95, launch program "instlinks" by executing file "hppinstlinks.exe;" (2) after program "instlinks" has been launched and completed, launch program "Director" by executing file "hppdirector.exe;" (3) if the predetermined contingency occurs (user requests test page print), launch program "Software Config." by executing file "hppsoftconfipage.exe." When the predetermined contingency occurs, the program may be launched before and/or after the launch of the previous program has been completed.

In alternative embodiments, program launch management module 112 may be hard-coded with a predefined program launch procedure. In other words, program launch management module 112 need not be a flexible program configured to input the information related to the application programs to be launched and/or the program launch procedure. Instead of receiving this information as an input to the program, such as by accessing the data file and/or receiving the information via a user interface, program launch management module 112 may be configured with this information. This implementation may not be the most flexible solution because only the specified application programs and the specified program launch procedure may be implemented. Nonetheless, it may be advantageous in certain situations.

Figure 4:
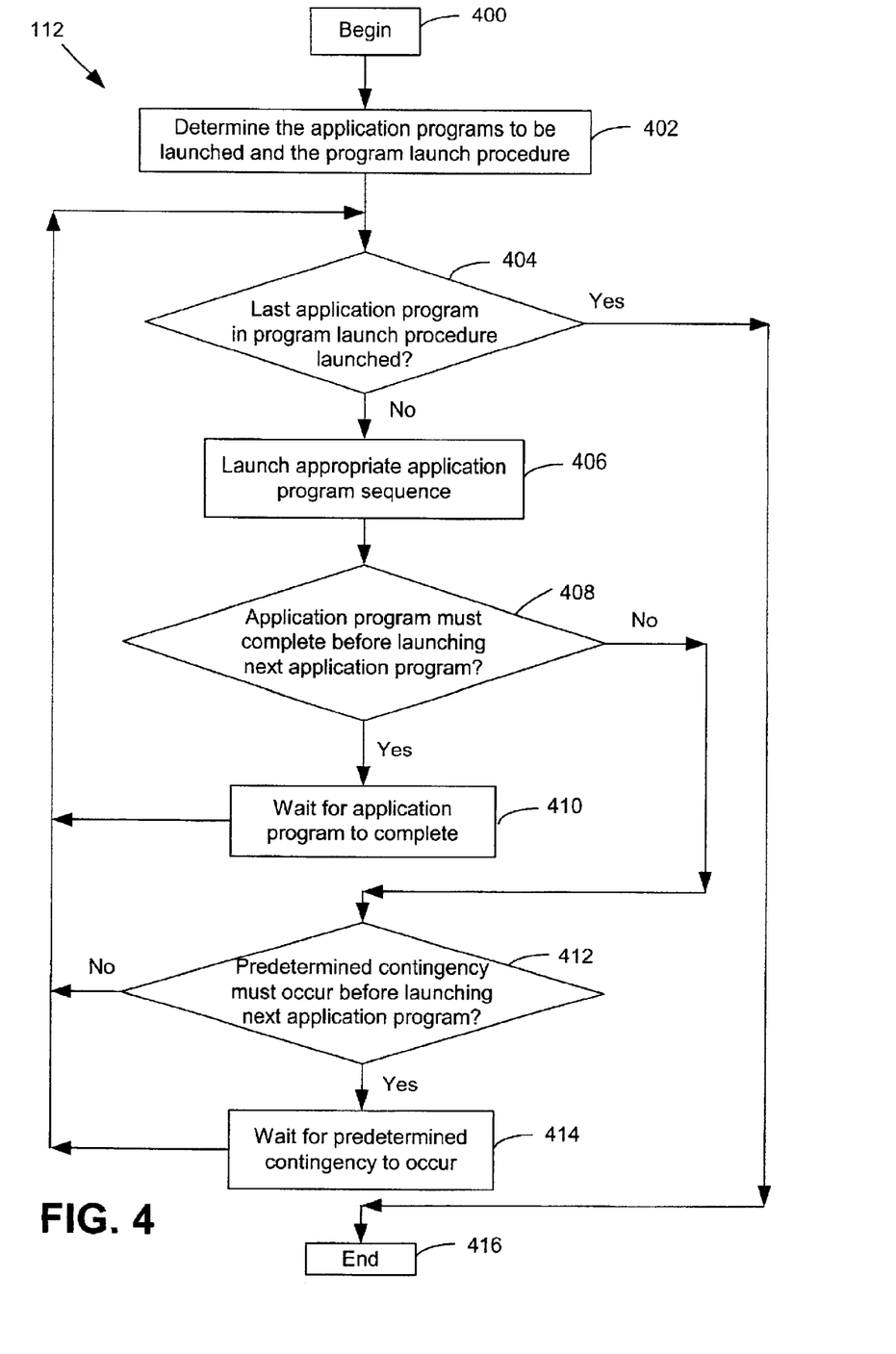
FIG. 4 is a flowchart illustrating the architecture, operation, and/or functionality of another embodiment of the program launch management module of FIGS. 1 and 2.

FIG. 4 is a more detailed flowchart illustrating the architecture, operation, and/or functionality of another embodiment of program launch management module 112. After beginning at block 400, at block 402, program launch management module 112 determines the application programs and the program launch procedure as described above. At decision block 404, program launch management module 112 determines whether there are additional application programs to be launched. If all of the application programs have been launched, program launch management module 112 terminates at block 416. If there are additional application programs to be launched, at block 406, program launch management module 112 launches the appropriate application program in sequence.

At decision block 408, program launch management module 112 determines whether the current application must complete before launching the next application program in the sequence. If the current application program is to complete, program launch management module 112 waits for the application to complete, at block 410, and then the process is repeated at decision block 404 for the remaining application programs. If the current application does not have to complete before launching the next application program, program launch management module 112 determines, at block 412, whether there is a predetermined contingency associated with the current application program that is to occur before launching the next application program in the sequence. If a predetermined contingency does exist for the current application program, at block 414, program launch management module 112 waits for the predetermined contingency to occur and then the process is repeated at decision block 404 for the remaining application programs. If no predetermined contingency exists, program launch management module 112 repeats the process at decision block 404 for the remaining application programs.

Figure 5:
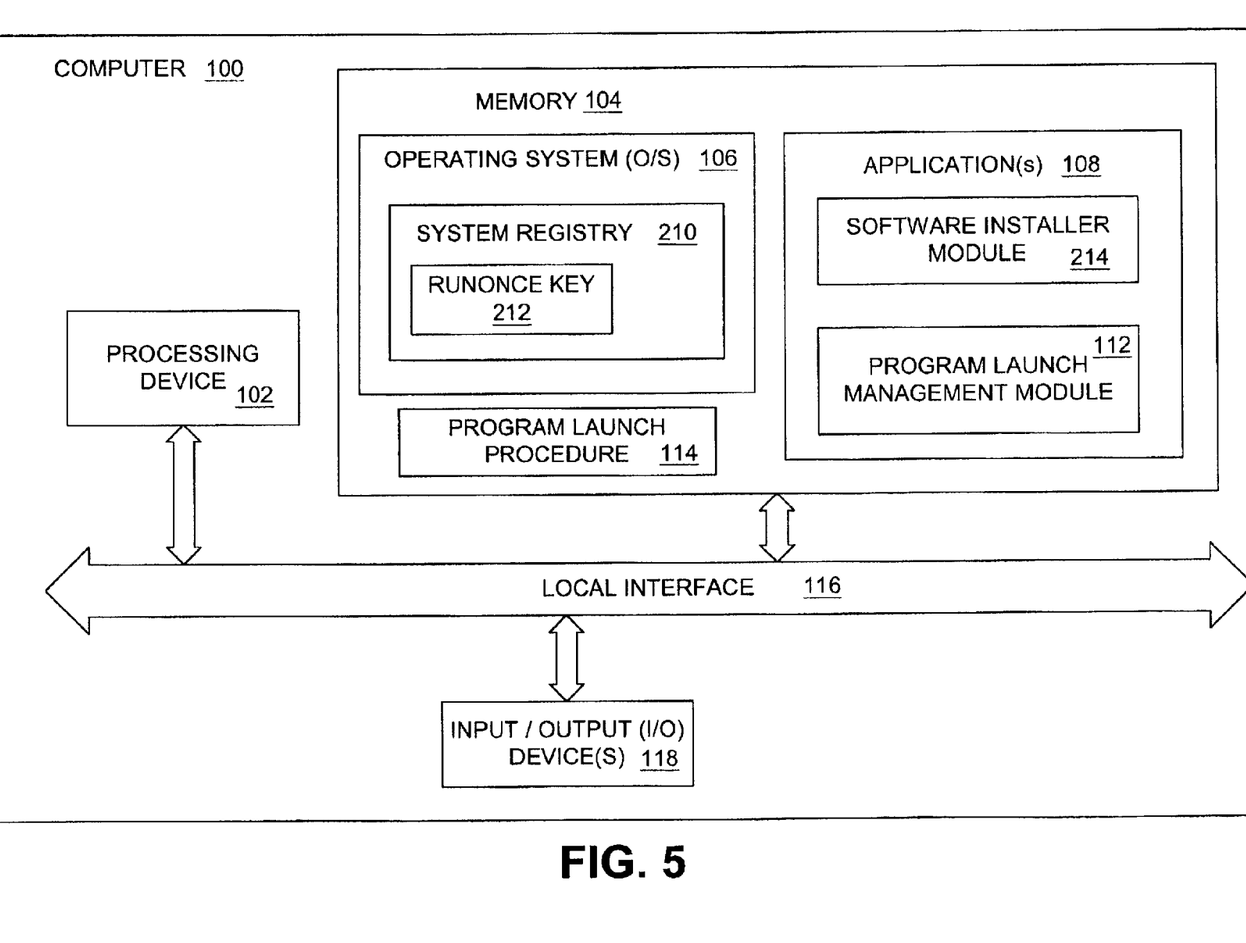
FIG. 5 is a schematic diagram illustrating another embodiment of a computer for implementing the program launch management module of FIG. 1.
Figure 6:
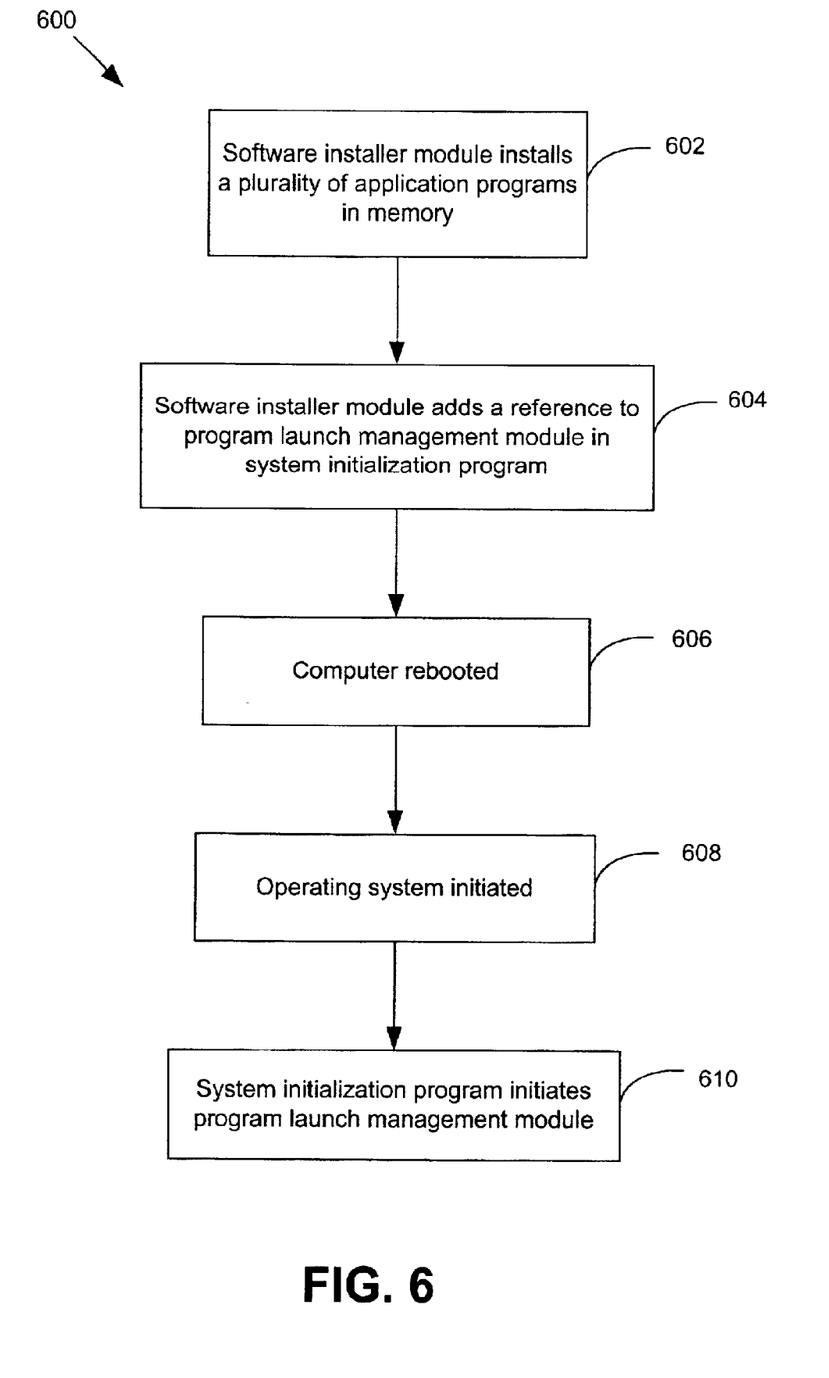
FIG. 6 is a flowchart illustrating the operation of the computer of FIG. 5 implementing the program launch management module of FIGS. 2 and 4.

Referring to FIGS. 5 and 6, a specific implementation of program launch management module 112 within computer 100 will be described. FIG. 5 illustrates the computer 100 of FIG. 1 further comprising a software installer module 214 and in which operating system 106 further comprises a system initialization program (e.g. a RunOnce key 212 in a system registry 210). Software installer module 214 may be configured to install one or more other programs in memory 104. For example, software installer module 214 may be used to guide a user, via a user interface, through the process of setting up an application to operate on computer 100 and to communicate properly with one or more hardware devices, including I/O devices 118, one or more applications 108, and/or operating system 106.

System registry 210 may comprise a hierarchical database associated with the operating system 106 and used to store information necessary to configure the computer 100 for one or more users, applications, and hardware devices. System registry 210 may contain information that the operating system 106 references during operation. For example, system registry 210 may contain profiles for each user, information about the applications installed in memory 104 and the types of documents each can create, property sheet settings for folders and application icons, what hardware exists on the computer 100, and which ports are being used.

The system initialization program may store the names of programs that the operating system 106 executes when the computer 100 is initialized. One of ordinary skill in the art will appreciate that, depending on the type of operating system 106, the system initialization program may be referred to in different terms and may be configured in a variety of ways. As illustrated in the embodiment of FIG. 5, where a Windows operating system is employed, the system initialization program may comprise a RunOnce key 212 within the system registry 210. RunOnce key 212 stores the names of programs that Windows executes at startup, for all users of the computer, the next time the computer starts. RunOnce key 212 allows the programs to be launched one time in Windows and then deletes the reference to the programs so they will not run again. RunOnce key 212 comprises one or more entries, in which each entry typically includes a program name, a data type, and a filename for executing the program.

FIG. 6 is a flowchart illustrating a method 600 employed using computer 100 of FIG. 5 for implementing program launch management module 112 and for controlling the manner in which a plurality application programs installed in memory 104 are executed by operating system 106. At block 602, the software installer module 214 installs a plurality of application programs in memory 104. For example, the software installer module 214 may copy files to a file system in memory 104 of computer 100. At block 604, the software installer module 214 adds a reference to program launch management module 112 in the system initialization program, such as RunOnce key 212, in operating system 106. After the application programs are installed, the computer 100 is rebooted at block 606. Then, at block 608, the computer 100 initiates the operating system 106. Finally, at block 610, the system initialization program initiates program launch management module 112. Program launch management module 112 may be configured in the manner described above. In this example, program launch management module 112 would be configured to launch one or more of the application programs installed by software installer module 214 in a predetermined manner.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A computer program on a computer readable storage for use in a computer having an operating system, the computer program comprising code for:

determining a plurality of application programs that are to be launched by the operating system;

determining a program launch procedure associated with the application programs, the program launch procedure defining a sequence in which the application programs are to be launched by the operating system, the sequence based on the functionality of at least one of the application programs;

defining a predetermined contingency related to the launch of one of the application programs when another of the application programs accesses certain data after it is launched and reaches a predefined point in the launch process; and launching other application programs with the operating system based on the program launch procedure, wherein one of the application programs is launched and in response to the predetermined contingency, launching another of the application programs comprises including predefined program dependencies as data in a system registry for specifying the predetermined contingency.

2. The computer program of claim 1, wherein launching the application programs based on the program launch procedure comprises:

launching one of the application programs;

after a predetermined length of time, launching another of the application programs.

3. The computer program of claim 1, wherein the program launch procedure is specified by a user via a user interface device.

4. The computer program of claim 1, wherein determining a program launch procedure associated with the application programs comprises accessing a data file stored in a memory.

5. The computer program of claim 1, wherein the program launch procedure further defines an operating system restriction for at least one of the application programs.

6. The computer program of claim 1, wherein the launching the application programs with the operating system is initiated by the operating system.

7. A method for controlling the manner in which application programs are launched on a computer, the computer comprising a processor adapted to control the operation of the computer and memory comprising an operating system that includes a system initialization program adapted to store a list of programs to be launched by the operating system, the method comprising the steps of:

storing a reference to a program launch management module in the system initialization program, the program launch management module configured to:

determine application programs that are to be launched by the operating system;

determine a program launch procedure associated with the application programs, the program launch procedure defining a sequence in which the application programs are to be launched, the sequence based on the functionality of at least one of the application programs;

defining a predetermined contingency related to the launch of one of the application programs when another of the application programs accesses certain data after it is launched and reaches a predefined point in the launch process; and launch other application programs based on the program launch procedure, wherein one of the application programs is launched and in response to the predetermined contingency, launching another of the application programs comprises including predetermined program dependencies as data in a system registry for specifying the predetermined contingency; and accessing the system initialization program and executing the program launch management module.

8. The method of claim 7, further comprising the step of installing the application programs on the computer before the step of storing a reference to a program launch management module in the system initialization program.

9. The method of claim 7, wherein launching the application programs based on the program launch procedure comprises:

launching one of the application programs;

after a predetermined length of time, launching another of the application programs.

10. The method of claim 7, wherein the program launch procedure is specified by a user via a user interface device.

11. The method of claim 7, wherein determining a program launch procedure associated with the application programs comprises accessing a data file stored in a memory.

12. The method of claim 7, wherein the program launch procedure further defines an operating system restriction for at least one of the application programs.

13. The method of claim 7, further comprising the step of initializing the operating system after the step of storing a reference to a program launch management module in the system initialization program.

14. The method of claim 7, wherein the operating system is Windows-based.

15. The method of claim 14, wherein the system initialization program comprises a RunOnce key in a system registry associated with the operating system.

16. A method for controlling the launching of application programs by an operating system, the method comprising the steps of:

determining application programs that are to be launched by the operating system;

determining a program launch procedure associated with the application programs, the program launch procedure defining a sequence in which the application programs are to be launched by the operating system, the sequence based on the functionality of at least one of the application programs;

defining a predetermined contingency related to the launch of one of the application programs when another of the application programs accesses certain data after it is launched and reaches a predefined point in the launch process; and launching other plurality of application programs based on the program launch procedure, wherein one of the application programs is launched and in response to the predetermined contingency, launching another of the application programs comprises including predefined program dependencies as data in a system registry for specifying the predetermined contingency.

17. The method of claim 16, wherein the step of launching the application programs based on the program launch procedure comprises the steps of launching one of the application programs;

after a predetermined length of time, launching another of the application programs.

18. The method of claim 16, wherein the program launch procedure is specified by a user via a user interface device.

19. The method of claim 16, wherein the step of determining a program launch procedure associated with the application programs further comprises the step of accessing a data file stored in a memory.

20. The method of claim 16, wherein the program launch procedure further defines an operating system restriction for at least one of the application programs.

21. The method of claim 16, wherein the step of launching the application programs with the operating system is initiated by the operating system.

* * * * *